(12) United States Patent
Tompkins et al.

(10) Patent No.: US 11,544,919 B2
(45) Date of Patent: Jan. 3, 2023

(54) DRONE INSPECTION OF AN UNDIFFERENTIATED SURFACE USING A REFERENCE IMAGE

(71) Applicant: PrecisionHawk, Inc., Raleigh, NC (US)

(72) Inventors: Matthew E. Tompkins, Portland, OR (US); John P. Cannon, Jr., Raleigh, NC (US); Richard P. Statile, Chapel Hill, NC (US)

(73) Assignee: PRECISIONHAWK, INC., Raleigh, NC (US)

( * ) Notice: Subject to any disclaimer, the term of this patent is extended or adjusted under 35 U.S.C. 154(b) by 0 days.

(21) Appl. No.: 17/116,569

(22) Filed: Dec. 9, 2020

(65) Prior Publication Data
US 2022/0180085 A1 Jun. 9, 2022

(51) Int. Cl.
*G06V 20/13* (2022.01)
*G06V 10/25* (2022.01)

(52) U.S. Cl.
CPC .............. *G06V 20/13* (2022.01); *G06V 10/25* (2022.01)

(58) Field of Classification Search
CPC ........ G06V 20/13; G06V 20/17; G06V 20/52; G06V 10/25
See application file for complete search history.

(56) References Cited

U.S. PATENT DOCUMENTS

| | | | |
|---|---|---|---|
| 8,873,837 | B2 | 10/2014 | Jahanshahi et al. |
| 9,607,370 | B2 | 3/2017 | Freeman |
| 9,915,946 | B2 | 3/2018 | Poole et al. |
| 10,169,856 | B1 | 1/2019 | Farnsworth et al. |
| 10,176,527 | B1 | 1/2019 | Freeman et al. |
| 10,377,485 | B2 | 8/2019 | Claybrough |
| 10,564,392 | B2 | 2/2020 | Watanabe |
| 2014/0336928 | A1 | 11/2014 | Scott |

(Continued)

FOREIGN PATENT DOCUMENTS

| KR | 101994412 B | 6/2019 |
|---|---|---|
| WO | 2019073704 A1 | 8/2019 |
| WO | 2020046213 A1 | 3/2020 |

OTHER PUBLICATIONS

Aicardi, Irene et al., "An Image-Based Approach for the Co-Registration of Multi-Temporal UAV Image Datasets," Remote Sens. 2016, 8, 779, https://www.mdpi.com/2072-4292/8/9/779, Sep. 21, 2016, 20 pages.

(Continued)

*Primary Examiner* — Sam Bhattacharya
(74) *Attorney, Agent, or Firm* — Withrow & Terranova, P.L.L.C.

(57) ABSTRACT

Drone inspection of an undifferentiated surface using a reference image is disclosed. A plurality of images of a surface of a structure are analyzed to identify at least one image that depicts a feature in a portion of the surface based on a feature criterion, the plurality of images being generated by a drone comprising a camera, each image depicting a corresponding portion of the surface, and at least some of the images depicting the corresponding portion of the surface and a portion of a reference image. A location on the surface that corresponds to the at least one image is determined based on a depiction of the reference image in an image of the plurality of images.

19 Claims, 5 Drawing Sheets

(56) References Cited

U.S. PATENT DOCUMENTS

| | | | |
|---|---|---|---|
| 2016/0150219 A1* | 5/2016 | Gordon | G06T 7/521 348/46 |
| 2017/0352100 A1 | 12/2017 | Shreve et al. | |
| 2018/0003656 A1 | 1/2018 | Michini et al. | |
| 2019/0311203 A1* | 10/2019 | Shah | G06K 9/6226 |
| 2019/0364387 A1 | 11/2019 | Mian | |
| 2019/0392211 A1 | 12/2019 | Hartman et al. | |
| 2020/0074730 A1 | 3/2020 | Shloosh et al. | |
| 2020/0162626 A1 | 5/2020 | Yonaha | |

OTHER PUBLICATIONS

Gopalakrishnan, Kasthurirangan et al., "Crack Damage Detection in Unmanned Aerial Vehicle Images of Civil Infrastructure Using Pre-Trained Deep Learning Model," International Journal for Traffic and Transport Engineering, 2018, 8(1): 1-14, https://pdfs.semanticscholar.org/6ea3/58c63de04be500d1ecfffb6f59617ae8bb2a.pdf, Jan. 1, 2018, 14 pages.

Kim, Hyunjun, et al., "Concrete Crack Identification Using a UAV Incorporating Hybrid Image Processing," Sensors 2017, 17(9), 2052, Sep. 7, 2017, 14 pages.

Máthé, Koppány, et al., "Vision and Control for UAVs: A Survey of General Methods and of Inexpensive Platforms for Infrastructure Inspection," Sensors 2015, 15, 14887-14916, Jun. 25, 2015, 30 pages.

Perry, Brandon J., et al., "Streamlined bridge inspection system utilizing unmanned aerial vehicles (UAVs) and machine learning," Measurement 164 (2020) 108048, Jun. 5, 2020, 14 pages.

Valenca, J., et al., "Assessment of cracks on concrete bridges using image processing supported by laser scanning survey," Construction and Building Materials, vol. 146, Aug. 15, 2017, 8 pages.

Zhu, Qiuchen, et al., "Crack Detection Using Enhanced Thresholding on UAV based Collected Images," https://www.researchgate.net/publication/329798595_Crack_Detection_Using_Enhanced_Thresholding_on_UAV_based_Collected_Images, Dec. 19, 2018, 7 pages.

* cited by examiner

DRONE INSPECTION OF AN UNDIFFERENTIATED SURFACE USING A REFERENCE IMAGE

BACKGROUND

The embodiments relate to inspection of an undifferentiated surface using unmanned aerial vehicles such as drones.

SUMMARY

The embodiments disclosed herein implement drone inspection of an undifferentiated surface using a reference image.

In one embodiment a method is provided. The method includes analyzing a plurality of images of a surface of a structure to identify at least one image that depicts a feature in a portion of the surface based on a feature criterion, the plurality of images being generated by a drone comprising a camera, each image depicting a corresponding portion of the surface, and at least some of the images depicting the corresponding portion of the surface and a portion of a reference image. The method further includes determining a location on the surface that corresponds to the at least one image based on a depiction of the reference image in an image of the plurality of images.

In another embodiment a computing device is provided. The computing device includes a memory, and a processor device coupled to the memory. The processor device is configured to analyze a plurality of images of a surface of a structure to identify at least one image that depicts a feature in a portion of the surface based on a feature criterion, the plurality of images being generated by a drone comprising a camera, each image depicting a corresponding portion of the surface, and at least some of the images depicting the corresponding portion of the surface and a portion of a reference image. The processor device is further configured to determine a location on the surface that corresponds to the at least one image based on a depiction of the reference image in an image of the plurality of images.

In another embodiment a non-transitory computer-readable storage medium is provided. The non-transitory computer-readable storage medium includes executable instructions to cause a processor device to analyze a plurality of images of a surface of a structure to identify at least one image that depicts a feature in a portion of the surface based on a feature criterion, the plurality of images being generated by a drone comprising a camera, each image depicting a corresponding portion of the surface, and at least some of the images depicting the corresponding portion of the surface and a portion of a reference image. The executable instructions further cause the processor device to determine a location on the surface that corresponds to the at least one image based on a depiction of the reference image in an image of the plurality of images.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
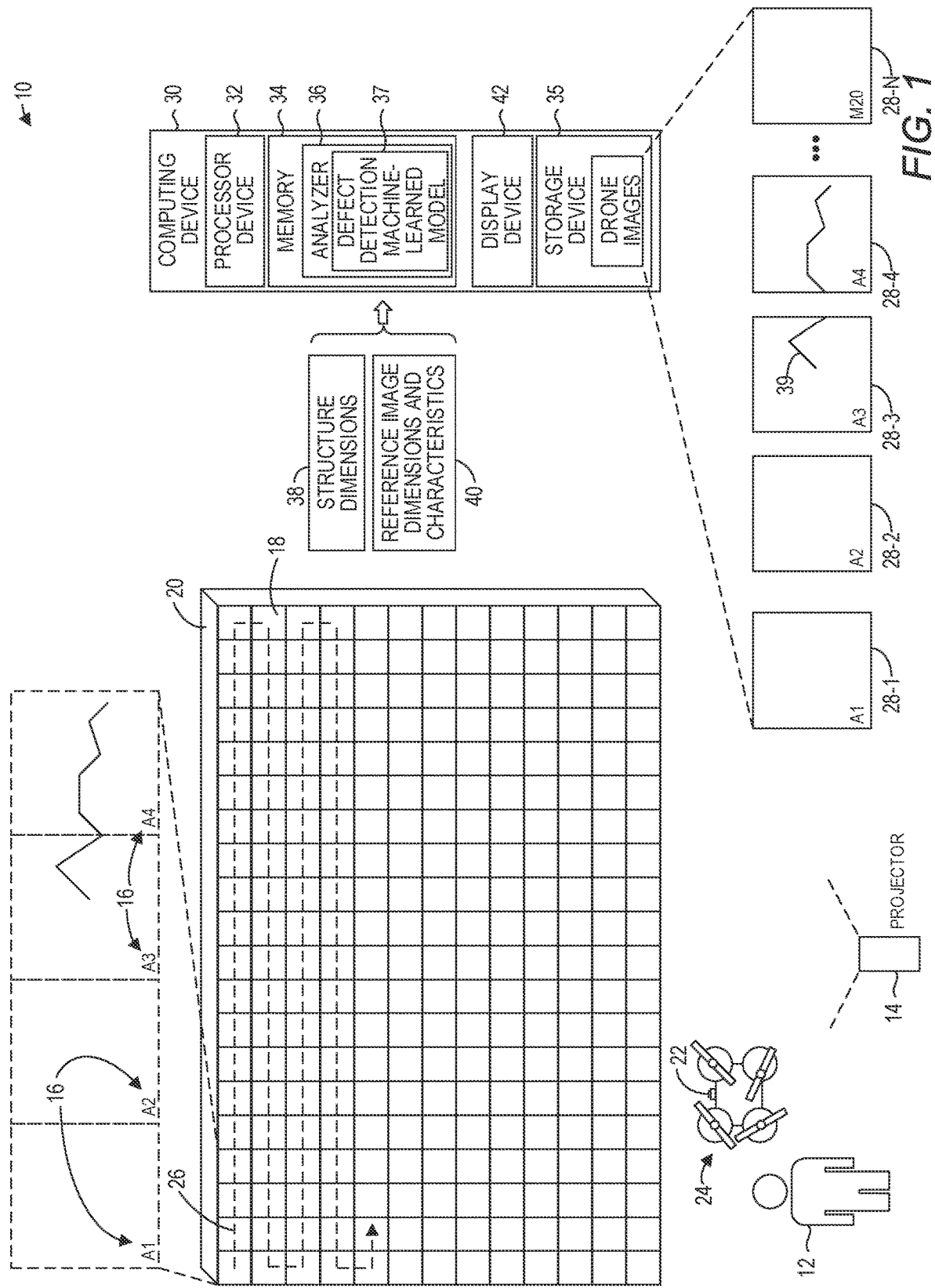
FIG. 1 is a diagram of an environment in which embodiments can be practiced.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The term drone is used herein as being synonymous with the term unmanned aerial vehicle.

Drones are often used to inspect large structures for features, such as, by way of non-limiting example, defects. Some large structures have an undifferentiated surface with a relatively uniform appearance over a large area. Examples are dams, nuclear containment structures, building facades, and the like. The undifferentiated surface may be monolithic, such as a concrete dam, or may be a consistent repetitive pattern, such as a brick wall. Often such structures are built using a material that bears few or no differentiating characteristics across the surface, such as concrete, bricks, and the like.

A drone may be used to inspect such structures periodically to determine whether the structures have any defects, such as a crack or other damage that may compromise the structure, or may otherwise be undesirable. The drone flies in relative close proximity to the structure capturing thousands of images of the structure for subsequent analysis and identification of potential defects. Each image may encompass a relatively small area size of the structure. The images are then subsequently inspected, either by a human or a computer, to identify images that depict a defect. A problem often arises in that the images are largely all very similar to one another in appearance due to the uniformity of the structure, and thus, when a defect is identified in an image, it can be difficult and/or time-consuming to determine the location on the structure to which the image corresponds. The drone may be operated manually by a drone operator, or may be programmed to fly a particular route autonomously without human involvement.

The embodiments disclosed herein implement drone inspection of an undifferentiated surface using a reference image. In particular, a reference image is projected onto the undifferentiated surface. The images taken by the drone capture at least a portion of the reference image. Images that contain defects can thus be easily correlated to an actual location on the undifferentiated surface for further examination and/or repair.

While the embodiments are discussed herein primarily in the context of a feature that comprises a defect, the embodiments are not limited to identifying defects, and may be utilized in any inspection context of a structure having an undifferentiated surface. FIG. 1 is a diagram of an environment 10 in which embodiments can be practiced. An operator 12 utilizes a projector 14 to project a reference image 16 onto a surface 18 of a structure 20. The surface 18 is an undifferentiated surface wherein large expanses of the surface 18 appear substantially the same to the human eye, either because the surface 18 is relatively monolithic, such as might occur if the structure 20 is made of concrete or some other construction material that transitions from a liquid state to a solid state, or because the surface has a relatively uniform pattern, such as might occur when a material is used repetitively across a surface, such as bricks, shingles, or the like.

In this example the reference image 16 comprises unique reference characters (e.g., A1, A2, A3) that are spaced a distance apart. The distance between the reference characters may be based, for example, on an expected area size of the surface 18 that will be depicted in each image captured by a camera 22 of a drone 24. The reference image 16 may also include grid lines that depict a grid of cells, each of which corresponds to a reference character, or may not depict such a grid, and the image may comprise solely the reference characters or other pattern. While for purposes of illustration the reference image 16 is depicted as a grid, other geometric shapes may be used, such as triangles, honeycomb-shaped areas, or the like, and indeed may comprise any pattern or image that provides a correspondence between an image captured by the camera 22 and a location on the surface 18.

The reference characters are preferably spaced at a distance such that each image captured by the camera 22 also captures at least one reference character. As an example, if the camera 22 is operated to fly at a distance from the surface 18 that results in each image capturing a 12 inch by 12 inch area size of the surface 18, the reference characters may be projected to be 10 inches apart from one another both horizontally and vertically. In some implementations the reference image 16 may be generated based on known dimensions of the structure 20 and area size of the surface 18 that will be captured by the camera 22. While alphanumeric reference numerals are illustrated, the reference image 16 may comprise any pattern or image that provides a correspondence between an image captured by the camera 22 and a location on the surface 18. In some embodiments, the projector 14 generates the reference image 16 in a visible wavelength.

In some implementations, the drone 24 may comprise multiple cameras 22, each camera 22 being capable of capturing electromagnetic radiation (EMR) in different wavelengths. In one implementation, the projector 14 emits the reference image 16 in an infrared wavelength, and the drone 24 comprises two cameras 22, a first camera 22 that operates in visible EMR wavelengths, and a second camera 22 that operates in infrared EMR wavelengths. The two cameras 22 may be operated to capture images substantially simultaneously and the images from each camera 22 can be correlated with one another.

In another embodiment, the camera 22 may have an ability to capture EMR in both visible and in at least some infrared wavelengths. The projector 14 may emit the reference image 16 in an infrared wavelength such that each image captured by the camera 22 depicts both a captured portion of the infrared reference image 16 and a portion of the surface 18.

The projector 14 may comprise any suitable EMR-emitting device, such as, by way of non-limiting example, a light-emitting diode (LED), liquid crystal display (LCD), or laser projector.

In this example, the drone 24 is programmed to fly autonomously in a path 26 starting at the top left of the surface 18 and finishing at the bottom of the surface 18. The drone 24 captures a plurality of images 28-1, 28-2, 28-3, 28-4-28-N (generally, images 28) of the surface 18. Each image 28 captures substantially the same area size of the surface 18. Preferably each image 28 captures a portion of the reference image 16. In the event that the reference image 18 is sized such that only some images 28 capture a portion of the reference image 16, the location on the surface 18 that corresponds to an image 28 that does not contain a portion of the reference image 16 can be determined based on a previously captured image 28, or a subsequently captured image 28 that does contain a portion of the reference image 16 based on the known path 26 and the substantially same area size of the surface 18 captured by the camera 22. The drone 24 may fly a distance from the surface 18 that is based on a number of different criteria. In some implementations, the distance may be in a range between 5 meters and 120 meters. In some embodiments, the distance may be expressed as "r" in accordance with the following formula:

$$\frac{\theta\left(\frac{2\pi}{360°}\right)r}{N_x g} = P$$

wherein $\vartheta$=lens field of view in degrees, r=distance in meters from the surface to be photographed, $N_{x,y}$=number of pixels in the x or y direction (e.g., 4096×4096), g=effective pixel cover (if the edges of the photo are too distorted to use, assume 90% of the pixels are okay), P=the length of the area on the surface 18 captured by each pixel of the camera.

The distance may in part be based on a smallest size of defect that is expected to be detected, and a desired number of camera sensor pixels to capture the defect. For example, it may be desired that the smallest expected defect be captured by at least 5, 7, or 10 camera sensor pixels.

The environment 10 includes a computing device 30, which in turn includes a processor device 32 and a memory 34. The operator 12 may copy the images 28 from the camera 22 to a storage device 35. The memory 34 includes an analyzer 36 that accesses the images 28 in accordance with some criterion. The analyzer 36 receives, as input, structure dimensions 38 that identify an area size of the surface 18. The analyzer 36 also receives information 40 that describes the reference image and characteristics. For example, the information 40 may describe a pattern, and an actual distance between elements in the pattern, sufficient for the analyzer 36 to identify a location on the surface 18 to which a portion of the pattern depicted in an image 28 corresponds.

The analyzer 36 analyzes the images 28. In some implementations, the analyzer 36 may utilize a defect detection machine-learned model 37 that has been trained to analyze the images 28 and provide predictions/probabilities that an image 28 depicts a defect. For purposes of illustration, assume that the analyzer 36 determines, for example, that the image 28-3 depicts a crack 39 in the surface 18. The analyzer 36 determines that the image 28-3 contains a portion of the reference image 16, in this example, the designation A3. The analyzer 36 accesses the structure dimensions 38 and the information 40 and, based on the designation A3, determines the corresponding location on the surface 18. The analyzer 36 may present, on a display device 42, information that indicates a defect on the surface 18 has been detected, and identifies the location on the surface 18 of the detected defect. The location may be identified, for example, with reference to a predetermined location of the surface 18, such as a bottom left corner of the surface 18. For example, the analyzer 36 may indicate that the defect is located 64 feet up and 3 feet to the right, measured from the bottom left corner of the surface 18. In some implementations, the analyzer 36 may present the image 28-3 and an image of the surface 18 on the display device 42, with the location of the defect on the surface 18 indicated in the image. An individual may then physically examine the actual surface 18 at the location to determine the extent of the defect, whether repairs are necessary, or the like.

It is noted that because the analyzer 36 is a component of the computing device 30, functionality implemented by the analyzer 36 may be attributed to the computing device 30 generally. Moreover, in examples where the analyzer 36 comprises software instructions that program the processor device 32 to carry out functionality discussed herein, functionality implemented by the analyzer 36 may be attributed herein to the processor device 32.

In some embodiments, the operator 12, or another individual, may browse the images 28 on the display device 42, and analyze the images 28 to identify defects. If the individual determines that an image 28 depicts a defect, the operator 12 may then identify the portion of the reference image 16 depicted in the image 28 and, based on the portion of the reference image 16, the dimensions of the surface 18, and the characteristics and dimensions of the reference image 16, calculate the location on the surface 18 that corresponds to the image 28.

Figure 2:
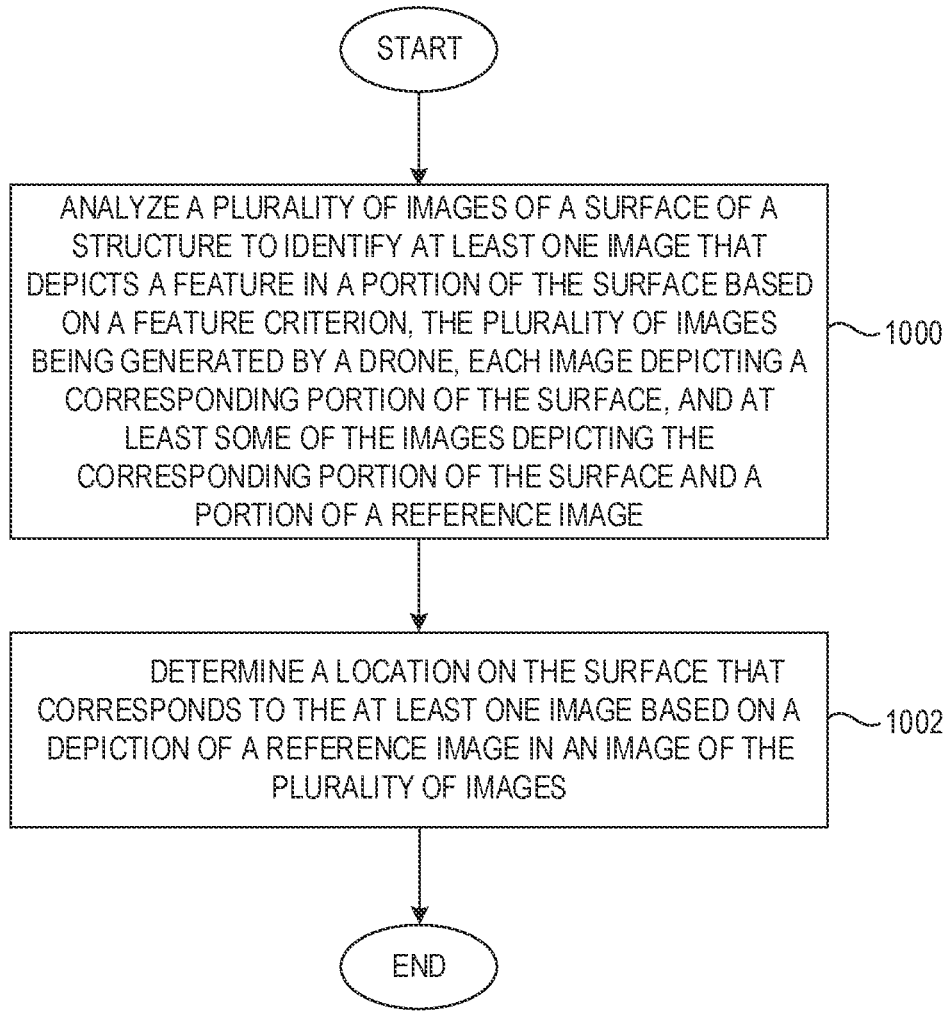
FIG. 2 is a flowchart of a method for drone inspection of an undifferentiated surface using a reference image, according to one embodiment.

FIG. 2 is a flowchart of a method for drone inspection of an undifferentiated surface using a reference image, according to one embodiment. FIG. 2 will be discussed in conjunction with FIG. 1. The plurality of images 28-1-28-N of the surface 18 of the structure 20 are analyzed to identify at least one image 28-3 that depicts a feature in a portion of the surface 18 based on a feature criterion, the plurality of images 28 being generated by the drone 24 comprising the camera 22, each image 28 depicting a portion of the surface 18, and at least some of the images 28 depicting a portion of the surface 18 and a portion of the reference image 16 (FIG. 2, block 1000). The feature criterion may be defined in any suitable manner, and is based on the types of features that may be identified, such as cracks, openings, discolorations or the like. The feature criterion may define a feature in terms of size, length, width, color or any other suitable metric. A location on the surface 18 that corresponds to the at least one image 28-3 is determined based on a depiction of the reference image 16 in an image 28 of the plurality of images 28 (FIG. 2, block 1002).

Figure 3:
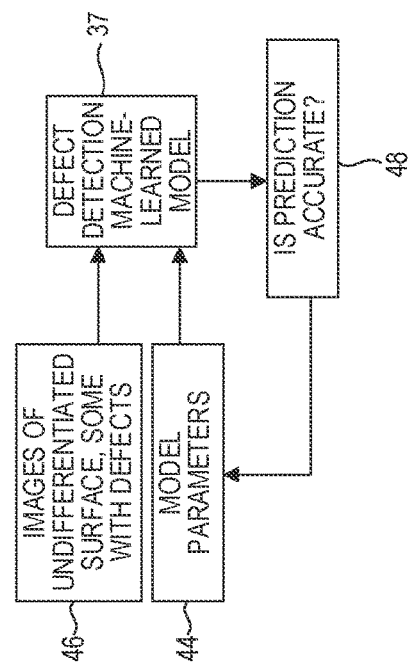
FIG. 3 is a block diagram that illustrates a process for training a defect detection machine-learned model according to one embodiment.

FIG. 3 is a block diagram that illustrates a process for training the defect detection machine-learned model 37 according to one embodiment. The defect detection machine-learned model 37 may comprise any suitable machine-learned model algorithm, such as, by way of non-limiting example, a neural network, deep learning neural network, a nearest neighbor, a naive Bayes, decision trees, linear regression, Support Vector Machines (SVM), k-means clustering, association rules, Q-Learning, Temporal Difference (TD), or the like.

In some embodiments, the defect detection machine-learned model 37 is provided with initial model parameters 44. Images 46 of an undifferentiated surface similar to the surface 18, such as a concrete surface or a surface having a same uniform pattern, are provided to the defect detection machine-learned model 37. Some of the images 46 depict defects. A back propagation process 48 provides input to the defect detection machine-learned model 37 regarding the accuracy of predictions of the defect detection machine-learned model 37 that an image 46 contains a defect. The model parameters 44 may be altered, either by an operator or the defect detection machine-learned model 37 based on the back propagation process 48. Once the defect detection machine-learned model 37 accurately predicts that an image 46 depicts a defect beyond some accuracy threshold, such as 90%, 95% or 99%, the defect detection machine-learned model 37 may be deemed to be sufficiently accurate for deployment.

Figure 4:
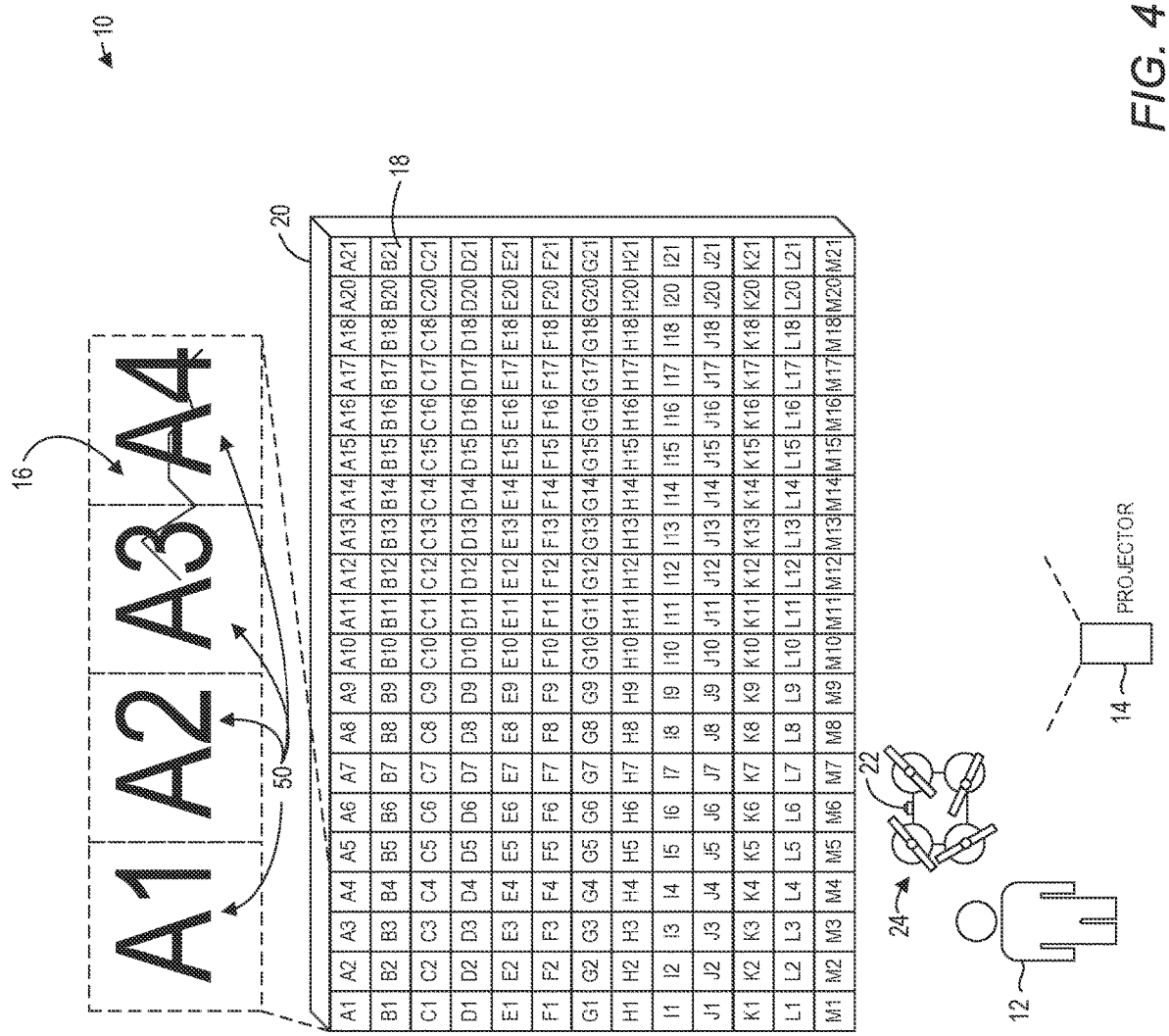
FIG. 4 is a diagram of the environment illustrated in FIG. 1 according to another embodiment.

FIG. 4 is a diagram of the environment 10 illustrated in FIG. 1 according to another embodiment. In this embodiment, prior to projecting the reference image 16 onto the surface 18, a legend image 50 is projected onto the surface 18. In this example, the legend image 50 projects enlarged reference characters that are identical to the reference characters used in the reference image 16. A photograph may be taken of the surface 18 while the legend image 50 is projected onto the surface 18 so that the operator 12, subsequently viewing an image 28 that depicts a defect and a smaller reference character can easily, viewing the image that contains the legend image 50, determine what location of the surface 18 corresponds to the image 28 that depicts the defect.

Figure 5:
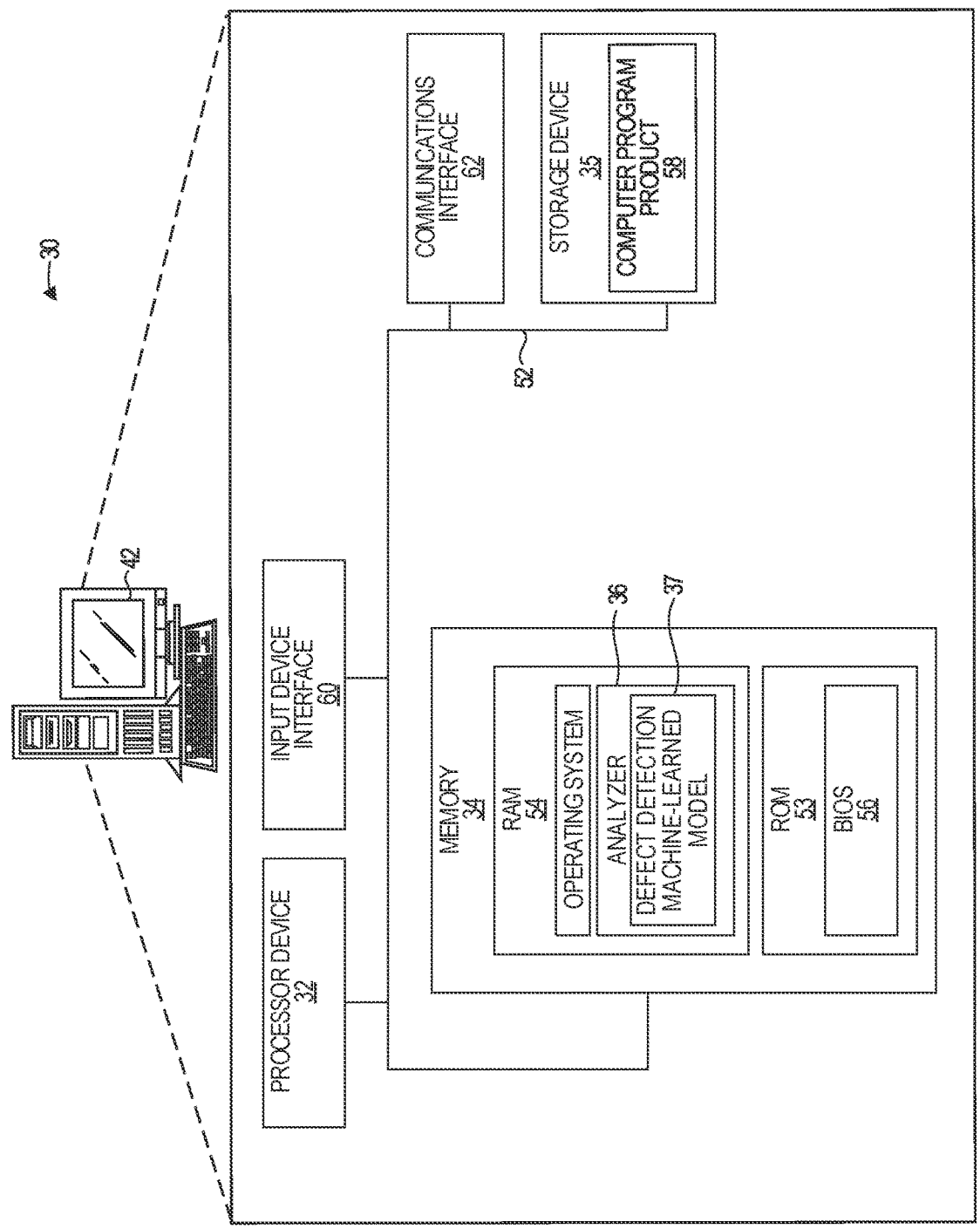
FIG. 5 is a block diagram of a computing device suitable for implementing embodiments.

FIG. 5 is a block diagram of the computing device 30 suitable for implementing examples according to one example. The computing device 30 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 30 includes the processor device 32, the memory 34, and a system bus 52. The system bus 52 provides an interface for system components including, but not limited to, the memory 34 and the processor device 32. The processor device 32 can be any commercially available or proprietary processor.

The system bus 52 may be any of several types of bus structures that may further interconnect to a memory bus (with or without a memory controller), a peripheral bus, and/or a local bus using any of a variety of commercially available bus architectures. The memory 34 may include non-volatile memory 53 (e.g., read-only memory (ROM), erasable programmable read-only memory (EPROM), electrically erasable programmable read-only memory (EEPROM), etc.), and volatile memory 54 (e.g., random-access memory (RAM)). A basic input/output system (BIOS) 56 may be stored in the non-volatile memory 53 and can include the basic routines that help to transfer information between elements within the computing device 30. The volatile memory 54 may also include a high-speed RAM, such as static RAM, for caching data.

The computing device 30 may further include or be coupled to a non-transitory computer-readable storage medium such as the storage device 35, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 35 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 35 and in the volatile memory 54, including, by way of non-limiting example, the analyzer 36. All or a portion of the examples may be implemented as a computer program product 58 stored on a transitory or non-transitory computer-usable or computer-readable storage medium, such as the storage device 35, which includes complex programming instructions, such as complex computer-readable program code, to cause the processor device 32 to carry out the steps described herein. Thus, the computer-readable program code can comprise software instructions for implementing the functionality of the examples described herein when executed on the processor device 32. The processor device 32, in conjunction with the analyzer 36 in the volatile memory 54, may serve as a controller, or control system, for the computing device 30 that is to implement the functionality described herein.

The operator 12 may also be able to enter one or more configuration commands through a keyboard (not illustrated), a pointing device such as a mouse (not illustrated), or a touch-sensitive surface such as the display device 42. Such input devices may be connected to the processor device 32 through an input device interface 60 that is coupled to the system bus 52 but can be connected by other interfaces such as a parallel port, an Institute of Electrical and Electronic Engineers (IEEE) 1394 serial port, a Universal Serial Bus (USB) port, an IR interface, and the like. The computing device 30 may also include a communications interface 62, such as a Wi-Fi or Ethernet transceiver suitable for communicating with a network as appropriate or desired.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
   analyzing a plurality of images of a surface of a structure to identify at least one feature-containing image that depicts a feature in a portion of the surface based on a feature criterion, the plurality of images being generated by a drone comprising a camera, each image of the plurality of images depicting a corresponding portion of the surface, and at least some images of the plurality of images depicting the corresponding portion of the surface and depicting a captured image portion of a projected reference image emitted onto the surface; and
   determining a location on the surface that corresponds to the at least one feature-containing image based on a depiction of the captured image portion of the projected reference image in an image of the plurality of images.

2. The method of claim 1 further comprising operating a projector to cause the projected reference image to be emitted onto the surface.

3. The method of claim 1 further comprising controlling the drone to capture the plurality of images of the surface of the structure.

4. The method of claim 1 wherein the surface of the structure comprises a plurality of surface areas having a uniform appearance devoid of distinguishing structural features, and wherein only a portion of the surface areas are encompassed by a field of view (FOV) of the camera that captured the plurality of images.

5. The method of claim 1 wherein the projected reference image comprises a pattern sized such that each image of the plurality of images depicts a portion of the pattern.

6. The method of claim 5 wherein the pattern comprises a grid of cells, each cell including a unique identifier, and wherein each image depicts a unique identifier of at least one cell.

7. The method of claim 5 wherein each image depicts a substantially uniform area size of the surface.

8. The method of claim 7 wherein the pattern is sized based on the substantially uniform area size of each image.

9. A computing device, comprising:
   a memory; and
   a processor device coupled to the memory to:
   analyze a plurality of images of a surface of a structure to identify at least one feature-containing image that depicts a feature in a portion of the surface based on a feature criterion, the plurality of images being generated by a drone comprising a camera, each image of the plurality of images depicting a corresponding portion of the surface, and at least some images of the plurality of images depicting the corresponding portion of the surface and depicting a captured image portion of a projected reference image emitted onto the surface; and
   determine a location on the surface that corresponds to the at least one feature-containing image based on a depiction of the captured image portion of the projected reference image in an image of the plurality of images.

10. The computing device of claim 9 wherein to analyze the plurality of images of the surface, the processor device is further configured to analyze the plurality of images of the surface via a machine-learned model that has been trained to identify features on the surface.

11. The computing device of claim 9 wherein the surface of the structure comprises a plurality of surface areas having a uniform appearance devoid of distinguishing structural features, and wherein only a portion of the surface areas are encompassed by a field of view (FOV) of the camera that captured the plurality of images.

12. The computing device of claim 9 wherein the projected reference image comprises a pattern sized such that each image of the plurality of images depicts a portion of the pattern.

13. The computing device of claim 12 wherein the pattern comprises a grid of cells, each cell including a unique identifier, and wherein each image depicts a unique identifier of at least one cell.

14. The computing device of claim 12 wherein each image depicts a substantially uniform area size of the surface.

15. The computing device of claim 14 wherein the pattern is sized based on the substantially uniform area size of each image.

16. A non-transitory computer-readable storage medium that includes executable instructions to cause a processor device to:
- analyze a plurality of images taken of a surface of a structure to identify at least one feature-containing image of the plurality of images that depicts a feature in a portion of the surface based on a feature criterion, the plurality of images being generated by a drone comprising a camera, each image of the plurality of images depicting a corresponding portion of the surface, and at least some of the images of the plurality of images depicting the corresponding portion of the surface and depicting a captured image portion of a projected reference image being emitted onto the surface; and
- determine a location on the surface that corresponds to the at least one feature-containing image based on a depiction of the captured image portion of the projected reference image in an image of the plurality of images.

17. The non-transitory computer-readable storage medium of claim 16 wherein to analyze the plurality of images taken of the surface the instructions further cause the processor device to analyze the plurality of images taken of the surface via a machine-learned model that has been trained to identify features on the surface.

18. The non-transitory computer-readable storage medium of claim 16 wherein the surface of the structure comprises a plurality of surface areas having a uniform appearance devoid of distinguishing structural features, and wherein only a portion of the surface areas are encompassed by a field of view (FOV) of the camera that captured the plurality of images.

19. The non-transitory computer-readable storage medium of claim 16 wherein the projected reference image comprises a pattern sized such that each image of the plurality of images depicts a portion of the pattern.

* * * * *